(12) United States Patent
Cao et al.

(10) Patent No.: US 11,742,652 B2
(45) Date of Patent: Aug. 29, 2023

(54) METHOD AND DEVICE FOR STARTING DIRECT-CURRENT (DC) TRANSMISSION LINE PROTECTION, AND STORAGE MEDIUM

(71) Applicants: CHINA ELECTRIC POWER RESEARCH INSTITUTE, Beijing (CN); STATE GRID CORPORATION OF CHINA, Beijing (CN)

(72) Inventors: Hong Cao, Beijing (CN); Zexin Zhou, Beijing (CN); Huanzhang Liu, Wuhan (CN); Dingxiang Du, Beijing (CN); Xingguo Wang, Beijing (CN)

(73) Assignees: CHINA ELECTRIC POWER RESEARCH INSTITUTE, Beijing (CN); STATE GRID CORPORATION OF CHINA, Beijing (CN)

( * ) Notice: Subject to any disclaimer, the term of this patent is extended or adjusted under 35 U.S.C. 154(b) by 96 days.

(21) Appl. No.: 17/438,524

(22) PCT Filed: Aug. 13, 2019

(86) PCT No.: PCT/CN2019/100356
§ 371 (c)(1),
(2) Date: Sep. 13, 2021

(87) PCT Pub. No.: WO2020/181718
PCT Pub. Date: Sep. 17, 2020

(65) Prior Publication Data
US 2022/0131367 A1 Apr. 28, 2022

(30) Foreign Application Priority Data

Mar. 14, 2019 (CN) .......................... 201910193788.5

(51) Int. Cl.
*H02H 3/44* (2006.01)

(52) U.S. Cl.
CPC .................................. *H02H 3/445* (2013.01)

(58) Field of Classification Search
CPC ........ H02H 3/087; H02H 3/202; H02H 3/243; H02H 3/445; H02H 3/50
See application file for complete search history.

(56) References Cited

U.S. PATENT DOCUMENTS

| 4,402,028 A | * | 8/1983 | Udren | .................... H02H 7/045 |
| | | | | 361/87 |
| 5,856,711 A | * | 1/1999 | Kato | ...................... H02H 3/087 |
| | | | | 307/10.6 |

(Continued)

FOREIGN PATENT DOCUMENTS

| CN | 105048424 A | 11/2015 |
| CN | 106602519 A | 4/2017 |

(Continued)

OTHER PUBLICATIONS

Y. Ma, H. Li, G. Wang and J. Wu, "Fault Analysis and Traveling-Wave-Based Protection Scheme for Double-Circuit LCC-HVDC Transmission Lines With Shared Towers," in IEEE Transactions on Power Delivery, vol. 33, No. 3, pp. 1479-1488, Jun. 2018, (Year : 2018).*

(Continued)

*Primary Examiner* — Peter M Novak
(74) *Attorney, Agent, or Firm* — Cooper Legal Group, LLC

(57) ABSTRACT

A method and device for starting direct-current (DC) transmission line protection, and a storage medium. The method includes: determining whether a sudden change of a DC line current at a present moment is greater than a sum of a memory start threshold and a maximum value in sudden changes of the DC line current within a time period preceding the present moment that is multiplied by a preset proportional coefficient, the time period being a time period (Continued)

between a moment preceding the present moment by a first duration and a moment preceding the present moment by a second duration; and starting DC transmission line protection in response to determining that the sudden change of the DC line current at the present moment is greater than the sum.

9 Claims, 2 Drawing Sheets

(56) References Cited

U.S. PATENT DOCUMENTS

| | | | |
|---|---|---|---|
| 9,859,085 | B2 | 1/2018 | Rozman et al. |
| 2016/0033566 | A1* | 2/2016 | Shiu .................. H02H 3/087 361/87 |
| 2017/0084414 | A1 | 3/2017 | Rozman et al. |
| 2021/0218241 | A1* | 7/2021 | Kitamura ............ H02H 1/0007 |

FOREIGN PATENT DOCUMENTS

| | | |
|---|---|---|
| CN | 108923398 A | 11/2018 |
| CN | 109103853 A | 12/2018 |
| CN | 109921391 A | 6/2019 |

OTHER PUBLICATIONS

Li, S., Chen, W., Yin, X. and Chen, D. (2017), Protection scheme for VSC-HVDC transmission lines based on transverse differential current. IET Gener. Transm. Distrib., 11: 2805-2813. (Year: 2017).*
International Search Report in the international application No. PCT/CN2019/100356, dated Nov. 28, 2019, 2 pgs.
English translation of the Written Opinion of the International Search Authority in the international application No. PCT/CN2019/100356, dated Nov. 28, 2019, 4 pgs.
"Research on MMC-HVDC Transmission Line Protection Scheme Based on One Terminal Transient Current", Sep. 2017, Lianying Ning, Nengling Tai, Xiaodong Zhane and Wentao Huang, Proceedings of the CSEE, Chinese Society for Electronic Engineering, vol. 37, No. 17, 8 pgs.

* cited by examiner

METHOD AND DEVICE FOR STARTING DIRECT-CURRENT (DC) TRANSMISSION LINE PROTECTION, AND STORAGE MEDIUM

CROSS-REFERENCE TO RELATED APPLICATION

The present application claims priority to Chinese Patent Application No. 201910193788.5, filed to National Intellectual Property Administration, PRC on Mar. 14, 2019, the disclosure of which is hereby incorporated by reference in its entirety.

TECHNICAL FIELD

The disclosure relates to the technical field of transmission line protection, and in particular to, for example, a method and device for starting direct-current (DC) transmission line protection, and a storage medium.

BACKGROUND

Compared with a traditional alternating-current (AC) transmission system, a high-voltage direct-current (HVDC) transmission system has the advantages of large transmission capacity, long transmission distance, low loss, etc., and has been widely used in the aspects of long-distance power transmission, large-area power grid interconnection, underground cable transmission, etc. A high-voltage DC transmission line takes the responsibility of electric energy transmission between an energy production place and a load center, is long in transmission distance, severe in operation conditions, and higher in failure rate than other parts of the high-voltage DC transmission system. Therefore, high-performance high-voltage DC transmission line protection has important significance for improving the safety and stability of the entire power grid.

At present, a DC transmission line protection start element is a start element based on a voltage change. When a value obtained by subtracting a normal operating voltage from a voltage at a present moment is greater than a constant value, the start element based on the voltage change is started. If the constant value is large, the sensitivity of the start element based on the voltage change is low when a DC line slightly fails. If the constant value is small, the start element based on the voltage change may be started as long as disturbances occur, which not only results in low reliability, but also results in frequent start of the start element based on the voltage change during normal operation of the power grid. In addition, U.S. Pat. No. 4,402,028 mentioned that a relay may have nuisance trips and component fatigue.

SUMMARY

The technical solution of the disclosure provides a method and device for starting direct-current (DC) transmission line protection, and a storage medium, so as to solve the problem of low sensitivity and reliability of a start element based on a voltage change.

According to a first aspect, provided is a method for starting direct-current (DC) transmission line protection, which may include: determining whether a sudden change of a DC line current at a present moment is greater than a sum of a memory start threshold and a maximum value in sudden changes of the DC line current within a time period preceding the present moment that is multiplied by a preset proportional coefficient, the time period being a time period between a moment preceding the present moment by a first duration and a moment preceding the present moment by a second duration; and starting DC transmission line protection in response to determining that the sudden change of the DC line current at the present moment is greater than the sum of the memory start threshold and the maximum value in the sudden changes of the DC line current within the time period preceding the present moment that is multiplied by the preset proportional coefficient.

Herein, the event that the sudden change of the DC line current at the present moment is greater than the sum of the memory start threshold and the maximum value in the sudden changes of the DC line current within the time period preceding the present moment that is multiplied by the preset proportional coefficient includes: $\Delta i > i_{set0} + k\Delta i_{max}$, where $\Delta i$ is the sudden change of the DC line current at the present moment, $\Delta i = |i(t) - i(t-t_m)|$, $i(t)$ is a value of the DC line current at the present moment, and $i(t-t_m)$ is a value of the DC line current at a moment preceding the present moment by a duration m; $i_{set0}$ is the memory start threshold; k is the preset proportional coefficient; and $\Delta i_{max}$ is the maximum value in the sudden changes of the DC line current within the time period preceding the present moment, the first duration is $m_1$, the second duration is $m_2$, and $\Delta i_{max}$ is a maximum value in sudden changes of the DC line current at moments within a time period from $t-t_{m1}$ to $t-t_{m2}$, for each of the moments within the time period from $t-t_{m1}$ to $t-t_{m2}$, the sudden change of the DC line current at the moment being an absolute value of a difference between a value of the DC line current at the moment and a value of the DC line current at a moment preceding by a duration m, $0 < m_1 < m_2 \leq m$.

Herein, before determining whether the sudden change of the DC line current at the present moment is greater than the sum of the memory start threshold and the maximum value in the sudden changes of the DC line current within the time period preceding the present moment that is multiplied by the preset proportional coefficient, the method may further include: collecting the value of the DC line current $i(t)$ at the present moment, the value of the DC line current $i(t-t_m)$ at the moment preceding the present moment by the duration m, the value of the DC line current at each moment within the time period preceding the present moment, and a value of the DC line current at a moment preceding, by the duration m, each moment within the time period preceding the present moment; and calculating the sudden change $\Delta i$ of the DC line current at the present moment and the maximum value $\Delta i_{max}$ in the sudden changes of the DC line current within the time period preceding the present moment according to the collected value of the DC line current $i(t)$ at the present moment, the collected value of the DC line current $i(t-t_m)$ at the moment preceding the present moment by the duration m, the collected value of the DC line current at each moment within the time period preceding the present moment, and the collected value of the DC line current value at the moment preceding, by the duration m, each moment within the time period preceding the present moment.

Herein, after determining whether the sudden change of the DC line current at the present moment is greater than the sum of the memory start threshold and the maximum value in the sudden changes of the DC line current within the time period preceding the present moment that is multiplied by the preset proportional coefficient, the method may further include: determining whether the sudden change of the DC line current at each one of $N_1$ moments among N consecutive moments immediately following the present moment is greater than the sum of the memory start threshold and the maximum value in the sudden changes of the DC line current within the time period preceding the one of $N_1$ moments that is multiplied by the preset proportional coefficient. Herein, starting DC transmission line protection in response to determining that the sudden change of the DC line current at the present moment is greater than the sum of the memory start threshold and the maximum value in the sudden changes of the DC line current within the time period preceding the present moment that is multiplied by the preset proportional coefficient may include: starting DC transmission line protection in response to determining that the sudden change of the DC line current at each one of the $N_1$ moments among the N moments is greater than the sum of the memory start threshold and the maximum value in the sudden changes of the DC line current within the time period preceding the one of the $N_1$ moments that is multiplied by the preset proportional coefficient, where $N_1 \leq N$.

According to a second aspect, provided is a device for starting direct-current (DC) transmission line protection, which may include: a determination unit, configured to determine whether a sudden change of a DC line current at a present moment is greater than a sum of a memory start threshold and a maximum value in sudden changes of the DC line current within a time period preceding the present moment that is multiplied by a preset proportional coefficient, the time period being a time period between a moment preceding the present moment by a first duration and a moment preceding the present moment by a second duration; and an execution unit, configured to start DC transmission line protection according to a determination result of the determination unit.

Herein, the determination unit is configured to determine whether: $\Delta i > i_{set0} + k \Delta i_{max}$, where $\Delta i$ is the sudden change of the DC line current at the present moment, $\Delta i = |i(t) - i(t-t_m)|$, $i(t)$ is a value of the DC line current at the present moment, and $i(t-t_m)$ is a value of the DC line current at a moment preceding the present moment by a duration m; $i_{set0}$ is the memory start threshold; k is the preset proportional coefficient; and $\Delta i_{max}$ is the maximum value in the sudden changes of the DC line current within the time period preceding the present moment, the first duration is $m_1$, the second duration is $m_2$, and $\Delta i_{max}$ is a maximum value in sudden changes of the DC line current at moments within a time period from $t-t_{m1}$ to $t-t_{m2}$, for each of the moments within the time period from $t-t_{m1}$ to $t-t_{m2}$, the sudden change of the DC line current at the moment being an absolute value of a difference between a value of the DC line current at the moment and a value of the DC line current at a moment preceding by a duration m, $0 < m_1 < m_2 \leq m$.

Herein, the device further includes: a collection unit, configured to collect the value of the DC line current i(t) at the present moment, the value of the DC line current $i(t-t_m)$ at the moment preceding the present moment by the duration m, the value of the DC line current at each moment within the time period preceding the present moment, and a value of the DC line current at a moment preceding, by the duration m, each moment within the time period preceding the present moment; and a calculation unit, configured to calculate the sudden change $\Delta i$ of the DC line current at the present moment and the maximum value $\Delta i_{max}$ in the sudden changes of the DC line current within the time period preceding the present moment according to the collected value of the DC line current i(t) at the present moment, the collected value of the DC line current $i(t-t_m)$ at the moment preceding the present moment by the duration m, the collected value of the DC line current at each moment within the time period preceding the present moment, and the collected value of the DC line current value at the moment preceding, by the duration m, each moment within the time period preceding the present moment.

Herein, the determination unit is further configured to determine whether the sudden change of the DC line current at each one of $N_1$ moments among N consecutive moments immediately following the present moment is greater than the sum of the memory start threshold and the maximum value in the sudden changes of the DC line current within the time period preceding the one of $N_1$ moments that is multiplied by the preset proportional coefficient; and the execution unit is further configured to start DC transmission line protection in response to determining that the sudden change of the DC line current at each one of the $N_1$ moments among the N moments is greater than the sum of the memory start threshold and the maximum value in the sudden changes of the DC line current within the time period preceding the one of the $N_1$ moments that is multiplied by the preset proportional coefficient, where $N_1 N$.

According to a third aspect, provided is a device for starting DC transmission line protection, which may include: a memory, a processor, and a computer program stored on the memory and operable on the processor. The computer program, when executed by the processor, may implement the method for starting DC transmission line protection in the first aspect described above.

According to a fourth aspect, provided is a storage medium storing an information processing program which, when executed by a processor, may implement the method for starting DC transmission line protection in the first aspect described above.

DETAILED DESCRIPTION

Figure 1:
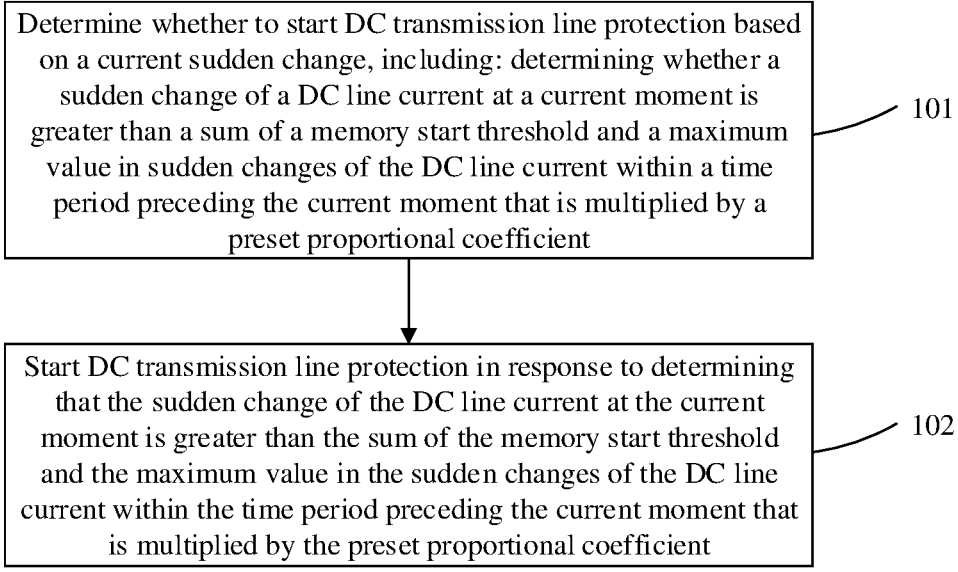
FIG. 1 illustrates a flowchart of a method for starting direct-current (DC) transmission line protection according to an embodiment of the disclosure.

Exemplary embodiments of the disclosure will now be described with reference to the accompanying drawings. FIG. 1 illustrates a flowchart of a method for starting direct-current (DC) transmission line protection according to an embodiment of the disclosure. A method for starting DC transmission line protection is provided in the disclosure. A sudden change of current is used as a criterion of determining whether to start DC transmission line protection. As illustrated in FIG. 1, the method for starting DC transmission line protection includes the following operations.

In operation 101, whether to start DC transmission line protection is determined based on a sudden change of current, including: determining whether a sudden change of a DC line current at a present moment is greater than a sum of a memory start threshold and a maximum value in sudden changes of the DC line current within a time period preceding the present moment that is multiplied by a preset proportional coefficient. The time period being a time period between a moment preceding the present moment by a first duration and a moment preceding the present moment by a second duration.

The maximum value in the sudden changes of the DC line current within the time period preceding the present moment that is multiplied by the preset proportional coefficient is a value obtained by multiplying the maximum value in the sudden changes of the DC line current within the time period preceding the present moment by the preset proportional coefficient.

In an embodiment, the event that the sudden change of the DC line current at the present moment is greater than the sum of the memory start threshold and the maximum value in the sudden changes of the DC line current within the time period preceding the present moment that is multiplied by the preset proportional coefficient includes: $\Delta i > i_{set0} + k\Delta i_{max}$.

$\Delta i$ is the sudden change of the DC line current at the present moment, $\Delta i = |i(t) - i(t-t_m)|$, $i(t)$ is a value of the DC line current at the present moment, and $i(t-t_m)$ is a value of the DC line current at a moment preceding the present moment by a duration m. $i_{set0}$ is the memory start threshold. k is the preset proportional coefficient for adjusting the maximum value in the sudden changes of the DC line current within the time period preceding the present moment. $\Delta i_{max}$ is the maximum value in the sudden changes of the DC line current within the time period preceding the present moment, the first duration is $m_1$, the second duration is $m_2$, and $\Delta i_{max}$ is a maximum value in sudden changes of the DC line current at moments within a time period from $t-t_{m1}$ to $t-t_{m2}$, for each of the moments within the time period from $t-t_{m1}$ to $t-t_{m2}$, the sudden change of the DC line current at the moment being an absolute value of a difference between a value of the DC line current at the moment and a value of the DC line current at a moment preceding by a duration m, $0 < m_1 < m_2 \le m$.

In operation 102, DC transmission line protection is started in response to determining that the sudden change of the DC line current at the present moment is greater than the sum of the memory start threshold and the maximum value in the sudden changes of the DC line current within the time period preceding the present moment that is multiplied by the preset proportional coefficient.

According to the embodiments of the disclosure, based on a current sudden change, a criterion is provided for determining whether to start DC transmission line protection, and the sensitivity and reliability of a DC transmission line protection start element are improved.

The method for starting DC transmission line protection provided in the disclosure includes the following operations.

(1) The value of the DC line current=$i(t)$ at the present moment is collected, and a current sudden change is calculated according to the value of the DC line current $i(t-t_m)$ at the moment preceding the present moment by the duration m. $\Delta i = |i(t) - i(t-t_m)|$. The maximum value $\Delta i_{max}$ in the sudden changes of the DC line current within the time period preceding the present moment. Whether $\Delta i > i_{set0} + k\Delta i_{max}$ is satisfied is determined.

(2) Values of the DC line current at N moments are consecutively collected, and a current sudden change corresponding to each of the N moments is calculated. Whether $\Delta i > i_{set0} + k\Delta i_{max}$ is satisfied at each of the N moments is determined. If $\Delta i > i_{set0} + k\Delta i_{max}$ is satisfied at $N_1$ moments among the N moments, DC transmission line protection is started. If $\Delta i > i_{set0} + k\Delta i_{max}$ is satisfied at less than $N_1$ moments among the N moments, DC transmission line protection is not started.

Figure 2:
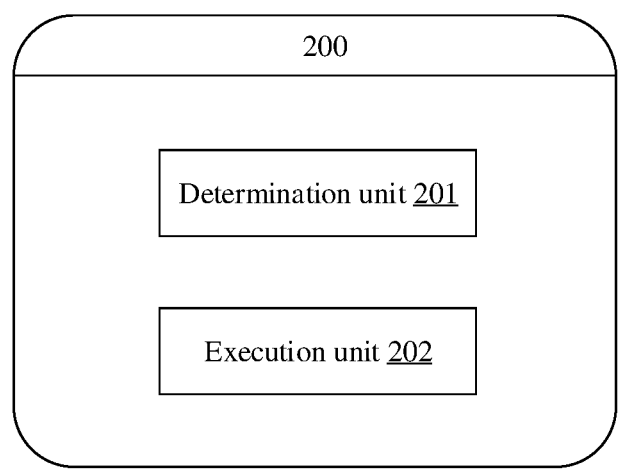
FIG. 2 illustrates a structural diagram of a device for starting DC transmission line protection according to an embodiment of the disclosure.

FIG. 2 illustrates a structural diagram of a device for starting direct-current (DC) transmission line protection according to an embodiment of the disclosure. As illustrated in FIG. 2, a device for starting DC transmission line protection includes a first judgment unit 201 and an execution unit 202.

The judgment unit 201 is configured to determine whether a sudden change of a DC line current at a present moment is greater than a sum of a memory start threshold and a maximum value in sudden changes of the DC line current within a time period preceding the present moment that is multiplied by a preset proportional coefficient. The time period is a time period between a moment preceding the present moment by a first duration and a moment preceding the present moment by a second duration.

In an embodiment, the determination unit 201 is configured to determine whether:

$$\Delta i > i_{set0} + k\Delta i_{max}$$

$\Delta i$ is the sudden change of the DC line current at the present moment, $\Delta i = i(t) - i(t-t_m)|$, $i(t)$ is a value of the DC line current at the present moment, and $i(t-t_m)$ is a value of the DC line current at a moment preceding the present moment by a duration m. $i_{set0}$ is the memory start threshold. k is the preset proportional coefficient for adjusting the maximum value in the sudden changes of the DC line current within the time period preceding the present moment. $\Delta i_{max}$ is the maximum value in the sudden changes of the DC line current within the time period preceding the present moment. The first duration is $m_1$. The second duration is $m_2$. $\Delta i_{max}$ is a maximum value in sudden changes of the DC line current at moments within a time period from $t-t_{m1}$ to $t-t_{m2}$. For each of the moments within the time period from $t-t_{m1}$ to $t-t_{m2}$, the sudden changes of the DC line current at the moment is an absolute value of a difference between a value of the DC line current at the moment and a value of the DC line current at a moment preceding by a duration m, $0 < m_1 < m_2 \le m$.

The execution unit 202 is configured to start DC transmission line protection according to a determination result of the determination unit.

In an embodiment, the device for starting DC transmission line protection further includes a collection unit and a calculation unit.

The collection unit is configured to collect the value of the DC line current $i(t)$ at the present moment, the value of the DC line current $i(t-t_m)$ at the moment preceding the present moment by the duration m, the value of the DC line current at each moment within the time period preceding the present moment, and a value of the DC line current at a moment preceding, by the duration m, each moment within the time period preceding the present moment.

The calculation unit is configured to calculate the sudden change $\Delta i$ of the DC line current at the present moment and the maximum value $\Delta i_{max}$ in the sudden changes of the DC line current within the time period preceding the present moment according to the collected value of the DC line current $i(t)$ at the present moment, the collected value of the DC line current $i(t-t_m)$ at the moment preceding the present moment by the duration m, the collected value of the DC line current at each moment within the time period preceding the present moment, and the collected value of the DC line current value at the moment preceding, by the duration m, each moment within the time period preceding the present moment.

In an embodiment, the determination unit is further configured to determine whether the sudden change of the DC line current at each one of $N_1$ moments among N consecutive moments immediately following the present moment is greater than the sum of the memory start threshold and the maximum value in the sudden changes of the DC line current within the time period preceding the one of $N_1$ moments that is multiplied by the preset proportional coefficient.

The execution unit is further configured to start DC transmission line protection in response to determining that the sudden change of the DC line current at each one of the $N_1$ moments among the N moments is greater than the sum of the memory start threshold and the maximum value in the sudden changes of the DC line current within the time period preceding the one of the $N_1$ moments that is multiplied by the preset proportional coefficient, where $N_1 \leq N$.

The device 200 for starting DC transmission line protection in the embodiment of the disclosure corresponds to the method 100 for starting DC transmission line protection in the implementation of the disclosure. Detailed descriptions are omitted herein.

Embodiments of the disclosure also provide a device for starting DC transmission line protection, which includes: a memory, a processor, and a computer program stored on the memory and operable on the processor. The computer program, when executed by the processor, implements the method for starting DC transmission line protection described above.

An embodiment of the present application also provides a storage medium storing an information processing program which, when executed by a processor, implements the method for starting DC transmission line protection described above.

It will be appreciated by those of ordinary skill in the art that all or some of the operations in the method disclosed above and the functional modules/units in the system and the device may be implemented as software, firmware, hardware, and a proper combination thereof. In hardware implementations, the division between the functional modules/units mentioned in the above description does not necessarily correspond to the division of physical components. For example, one physical component may have multiple functions, or one function or operation may be performed collaboratively by multiple physical components. Some or all of the components may be implemented as software performed by a processor such as a digital signal processor or a microprocessor, or implemented as hardware, or implemented as an integrated circuit such as an application-specific integrated circuit. Such software may be distributed on a computer readable medium which may include a storage medium (or non-transitory medium) and a communication medium (or transitory medium). As is well known to those of ordinary skill in the art, the term "storage medium" includes volatile and non-volatile media, and removable and non-removable media which are implemented in any method or technology for storing information (such as a computer readable instructions, a data structure, a program module, or other data). The storage medium includes, but is not limited to, a Random Access Memory (RAM), a Read-Only Memory (ROM), an Electrically Erasable Programmable Read-Only Memory (EEPROM), a flash memory or other memory technologies, a Compact Disc Read-Only Memory (CD-ROM), a Digital Video Disk (DVD) or other optical storage, a cartridge, a tape, a disk storage or other magnetic storage devices, or any other media which may be used for storing desired information and may be accessed by a computer. In addition, as is well known to those of ordinary skill in the art, the communication medium typically includes computer readable instructions, data structures, program modules, or other data in a modulated data signal such as carrier waves or other transport mechanisms and may include any information delivery media.

The invention claimed is:

1. A method for starting direct-current (DC) transmission line protection, the method comprising:
   determining whether to start DC transmission line protection based on a sudden change of a DC line current at a present moment and a maximum value in sudden changes of the DC line current within a time period preceding the present moment, comprising:
   determining whether the sudden change of the DC line current at the present moment is greater than a sum of a memory start threshold current value and a value obtained by multiplying the maximum value in the sudden changes of the DC line current that occurred within the time period preceding the present moment by a preset proportional coefficient, the time period being a time period between a moment preceding the present moment by a first duration and a moment preceding the present moment by a second duration; and
   starting DC transmission line protection in response to determining that the sudden change of the DC line current at the present moment is greater than the sum of the memory start threshold current value and the value obtained by multiplying the maximum value in the sudden changes of the DC line current that occurred within the time period preceding the present moment by the preset proportional coefficient;
   wherein the sudden change of the DC line current at the present moment is greater than the sum of the memory start threshold current value and the value obtained by multiplying the maximum value in the sudden changes of the DC line current that occurred within the time period preceding the present moment by the preset proportional coefficient when:

$$\Delta i > i_{set0} + k\Delta i_{max}$$

wherein $\Delta i$ is the sudden change of the DC line current at the present moment, $\Delta i = |i(t) - i(t-t_m)|$, $i(t)$ is a value of the DC line current at the present moment, and $i(t-t_m)$ is a value of the DC line current at a moment preceding the present moment by a duration m;
   $i_{set0}$ is the memory start threshold current value;
   k is the preset proportional coefficient; and
   $\Delta i_{max}$ is the maximum value in the sudden changes of the DC line current that occurred within the time period preceding the present moment, the first duration is $m_1$, the second duration is $m_2$, and $\Delta i_{max}$ is a maximum value in sudden changes of the DC line current that occurred at moments within a time period from $t-t_{m1}$ to $t-t_{m2}$, for each of the moments within the time period from $t-t_{m1}$ to $t-t_{m2}$, the sudden change of the DC line current at the moment being an absolute value of a difference between a value of the DC line current at the moment and a value of the DC line current at a moment preceding by a duration m, $0 < m_1 < m_2 \leq m$.

2. The method of claim 1, wherein the method further comprises, before determining whether the sudden change of the DC line current at the present moment is greater than the sum of the memory start threshold current value and the value obtained by multiplying the maximum value in the sudden changes of the DC line current that occurred within the time period preceding the present moment by the preset proportional coefficient:

collecting the value of the DC line current i(t) at the present moment, the value of the DC line current i(t−$t_m$) at the moment preceding the present moment by the duration m, the value of the DC line current at each moment within the time period preceding the present moment, and a value of the DC line current at a moment preceding, by the duration m, each moment within the time period preceding the present moment; and calculating the sudden change Δi of the DC line current at the present moment and the maximum value $Δi_{max}$ in the sudden changes of the DC line current that occurred within the time period preceding the present moment according to the collected value of the DC line current i(t) at the present moment, the collected value of the DC line current i(t−$t_m$) at the moment preceding the present moment by the duration m, the collected value of the DC line current at each moment within the time period preceding the present moment, and the collected value of the DC line current value at the moment preceding, by the duration m, each moment within the time period preceding the present moment.

3. The method of claim 1, after determining whether the sudden change of the DC line current at the present moment is greater than the sum of the memory start threshold current value and the value obtained by multiplying the maximum value in the sudden changes of the DC line current that occurred within the time period preceding the present moment by the preset proportional coefficient, further comprising:

determining whether the sudden change of the DC line current at each one of $N_1$ moments among N consecutive moments immediately following the present moment is greater than the sum of the memory start threshold current value and the value obtained by multiplying the maximum value in the sudden changes of the DC line current that occurred within the time period preceding the one of $N_1$ moments by the preset proportional coefficient, wherein starting DC transmission line protection in response to determining that the sudden change of the DC line current at the present moment is greater than the sum of the memory start threshold current value and the value obtained by multiplying the maximum value in the sudden changes of the DC line current that occurred within the time period preceding the present moment by the preset proportional coefficient comprises:

starting DC transmission line protection in response to determining that the sudden change of the DC line current at each one of the $N_1$ moments among the N moments is greater than the sum of the memory start threshold current value and the value obtained by multiplying the maximum value in the sudden changes of the DC line current that occurred within the time period preceding the one of the $N_1$ moments by the preset proportional coefficient, where $N_1 \leq N$.

4. A device for starting direct-current (DC) transmission line protection, comprising:

a memory, a processor, and a computer program stored on the memory and operable on the processor, wherein the computer program, when executed by the processor, implements following:

determining whether to start DC transmission line protection based on a sudden change of a DC line current at a present moment and a maximum value in sudden changes of the DC line current within a time period preceding the present moment, comprising:

determining whether the sudden change of the DC line current at the present moment is greater than a sum of a memory start threshold current value and a value obtained by multiplying the maximum value in the sudden changes of the DC line current that occurred within the time period preceding the present moment by a preset proportional coefficient, the time period being a time period between a moment preceding the present moment by a first duration and a moment preceding the present moment by a second duration; and starting DC transmission line protection in response to determining that the sudden change of the DC line current at the present moment is greater than the sum of the memory start threshold current value and the value obtained by multiplying the maximum value in the sudden changes of the DC line current that occurred within the time period preceding the present moment by the preset proportional coefficient;

wherein the sudden change of the DC line current at the present moment is greater than the sum of the memory start threshold current value and the value obtained by multiplying the maximum value in the sudden changes of the DC line current that occurred within the time period preceding the present moment by the preset proportional coefficient when:

$$\Delta i > i_{set0} + k\Delta i_{max}$$

wherein Δi is the sudden change of the DC line current at the present moment, Δi=|i(t)−i(t−$t_m$)|, i(t) is a value of the DC line current at the present moment, and i(t−$t_m$) is a value of the DC line current at a moment preceding the present moment by a duration m;

$i_{set0}$ is the memory start threshold current value;

k is the preset proportional coefficient; and $Δi_{max}$ is the maximum value in the sudden changes of the DC line current that occurred within the time period preceding the present moment, the first duration is $m_1$, the second duration is $m_2$, and $Δi_{max}$ is a maximum value in sudden changes of the DC line current that occurred at moments within a time period from t−$t_m$ to t−$t_{m2}$, for each of the moments within the time period from t−$t_{m1}$ to t−$t_{m2}$, the sudden change of the DC line current at the moment being an absolute value of a difference between a value of the DC line current at the moment and a value of the DC line current at a moment preceding by a duration m, 0<$m_1$<$m_2 \leq$m.

5. The device of claim 4, wherein the computer program is further executed by the processor to, before determining whether the sudden change of the DC line current at the present moment is greater than the sum of the memory start threshold current value and the value obtained by multiplying the maximum value in the sudden changes of the DC line current that occurred within the time period preceding the present moment by the preset proportional coefficient:

collect the value of the DC line current i(t) at the present moment, the value of the DC line current i(t−$t_m$) at the moment preceding the present moment by the duration m, the value of the DC line current at each moment within the time period preceding the present moment, and a value of the DC line current at a moment preceding, by the duration m, each moment within the time period preceding the present moment; and calculate the sudden change Δi of the DC line current at the present moment and the maximum value $Δi_{max}$ in the sudden changes of the DC line current that occurred within the time period preceding the present moment according to the collected value of the DC line current i(t) at the present moment, the collected value of the DC line current $i(t-t_m)$ at the moment preceding the present moment by the duration m, the collected value of the DC line current at each moment within the time period preceding the present moment, and the collected value of the DC line current value at the moment preceding, by the duration m, each moment within the time period preceding the present moment.

6. The device of claim 4, wherein after determining whether the sudden change of the DC line current at the present moment is greater than the sum of the memory start threshold current value and the value obtained by multiplying the maximum value in the sudden changes of the DC line current that occurred within the time period preceding the present moment by the preset proportional coefficient, the computer program is further executed by the processor to:

determine whether the sudden change of the DC line current at each one of $N_1$ moments among N consecutive moments immediately following the present moment is greater than the sum of the memory start threshold current value and the value obtained by multiplying the maximum value in the sudden changes of the DC line current that occurred within the time period preceding the one of $N_1$ moments by the preset proportional coefficient; and in starting DC transmission line protection in response to determining that the sudden change of the DC line current at the present moment is greater than the sum of the memory start threshold current value and the value obtained by multiplying the maximum value in the sudden changes of the DC line current that occurred within the time period preceding the present moment by the preset proportional coefficient, the computer program is further executed by the processor to:

start DC transmission line protection in response to determining that the sudden change of the DC line current at each one of the $N_1$ moments among the N moments is greater than the sum of the memory start threshold current value and the value obtained by multiplying the maximum value in the sudden changes of the DC line current that occurred within the time period preceding the one of the $N_1$ moments by the preset proportional coefficient, where $N_1 \leq N$.

7. A non-transitory computer-readable storage medium storing an information processing program which, when executed by a processor, implements a method for starting direct-current (DC) transmission line protection, the method comprising:

determining whether to start DC transmission line protection based on a sudden change of a DC line current at a present moment and a maximum value in sudden changes of the DC line current within a time period preceding the present moment, comprising:

determining whether the sudden change of the DC line current at the present moment is greater than a sum of a memory start threshold current value and a value obtained by multiplying the maximum value in the sudden changes of the DC line current that occurred within the time period preceding the present moment by a preset proportional coefficient, the time period being a time period between a moment preceding the present moment by a first duration and a moment preceding the present moment by a second duration; and starting DC transmission line protection in response to determining that the sudden change of the DC line current at the present moment is greater than the sum of the memory start threshold current value and the value obtained by multiplying the maximum value in the sudden changes of the DC line current that occurred within the time period preceding the present moment by the preset proportional coefficient;

wherein the sudden change of the DC line current at the present moment is greater than the sum of the memory start threshold current value and the value obtained by multiplying the maximum value in the sudden changes of the DC line current that occurred within the time period preceding the present moment by the preset proportional coefficient when:

$$\Delta i > i_{set0} + k \Delta i_{max}$$

wherein $\Delta i$ is the sudden change of the DC line current at the present moment, $\Delta i = |i(t) - i(t-t_m)|$, i(t) is a value of the DC line current at the present moment, and $i(t-t_m)$ is a value of the DC line current at a moment preceding the present moment by a duration m;

$i_{set0}$ is the memory start threshold current value;

k is the preset proportional coefficient; and $\Delta i_{max}$ is the maximum value in the sudden changes of the DC line current that occurred within the time period preceding the present moment, the first duration is $m_1$, the second duration is $m_2$, and $\Delta i_{max}$ is a maximum value in sudden changes of the DC line current that occurred at moments within a time period from $t-t_{m1}$ to $t-t_{m2}$, for each of the moments within the time period from $t-t_{m1}$ to $t-_{m2}$, the sudden change of the DC line current at the moment being an absolute value of a difference between a value of the DC line current at the moment and a value of the DC line current at a moment preceding by a duration m, $0 < m_1 < m_2 \leq m$.

8. The non-transitory computer-readable storage medium of claim 7, wherein the method further comprises, before determining whether the sudden change of the DC line current at the present moment is greater than the sum of the memory start threshold current value and the value obtained by multiplying the maximum value in the sudden changes of the DC line current that occurred within the time period preceding the present moment by the preset proportional coefficient:

collecting the value of the DC line current i(t) at the present moment, the value of the DC line current $i(t-t_m)$ at the moment preceding the present moment by the duration m, the value of the DC line current at each moment within the time period preceding the present moment, and a value of the DC line current at a moment preceding, by the duration m, each moment within the time period preceding the present moment; and calculating the sudden change $\Delta i$ of the DC line current at the present moment and the maximum value $\Delta i_{max}$ in the sudden changes of the DC line current that occurred within the time period preceding the present moment according to the collected value of the DC line current i(t) at the present moment, the collected value of the DC line current $i(t-t_m)$ at the moment preceding the present moment by the duration m, the collected value of the DC line current at each moment within the time period preceding the present moment, and the collected value of the DC line current value at the moment preceding, by the duration m, each moment within the time period preceding the present moment.

9. The non-transitory computer-readable storage medium of claim 7, after determining whether the sudden change of the DC line current at the present moment is greater than the sum of the memory start threshold current value and the value obtained by multiplying the maximum value in the sudden changes of the DC line current that occurred within the time period preceding the present moment by the preset proportional coefficient, the method further comprises:
  determining whether the sudden change of the DC line current at each one of $N_1$ moments among N consecutive moments immediately following the present moment is greater than the sum of the memory start threshold current value and the value obtained by multiplying the maximum value in the sudden changes of the DC line current that occurred within the time period preceding the one of $N_1$ moments by the preset proportional coefficient,
  wherein starting DC transmission line protection in response to determining that the sudden change of the DC line current at the present moment is greater than the sum of the memory start threshold current value and the value obtained by multiplying the maximum value in the sudden changes of the DC line current that occurred within the time period preceding the present moment by the preset proportional coefficient comprises:
    starting DC transmission line protection in response to determining that the sudden change of the DC line current at each one of the $N_1$ moments among the N moments is greater than the sum of the memory start threshold current value and the value obtained by multiplying the maximum value in the sudden changes of the DC line current that occurred within the time period preceding the one of the $N_1$ moments by the preset proportional coefficient, where $N_1 \leq N$.

\* \* \* \* \*